United States Patent [19]

Yamanaka

[11] Patent Number: 4,945,998

[45] Date of Patent: Aug. 7, 1990

[54] HYDRAULIC IMPACT TOOL

[75] Inventor: Takanobu Yamanaka, Yao, Japan

[73] Assignee: Nippon Pneumatic Manufacturing Co., Ltd., Osaka, Japan

[21] Appl. No.: 384,763

[22] Filed: Jul. 25, 1989

[30] Foreign Application Priority Data

Jul. 26, 1988 [JP] Japan ................................ 63-186349

[51] Int. Cl.[5] ................................................ B23B 45/16

[52] U.S. Cl. ....................................... 173/134; 92/216; 92/255

[58] Field of Search ....................... 173/134, 135, 136; 91/25, 217-321; 92/172, 216, 255

[56] References Cited

U.S. PATENT DOCUMENTS 4,563,938 1/1986 Henriksson ..................... 173/134 X

FOREIGN PATENT DOCUMENTS 2400925 7/1974 Fed. Rep. of Germany ...... 173/134

*Primary Examiner*—Frank T. Yost

*Assistant Examiner*—Willmon Fridie, Jr.

*Attorney, Agent, or Firm*—Wenderoth, Lind & Ponack

[57] ABSTRACT

An impact tool including a cylinder, a piston slidably mounted in the cylinder and a valve for selectively opening and closing oil feed channels to move the piston up and down. A cylindrical member is slidably mounted on the piston around its large-diameter portion or thereunder. Its bottom end defines the top end of a lower chamber formed in the cylinder. The cylindrical member is adapted to descend together with the piston. But when the piston strikes the object and rebounds upwardly, the cylindrical member keeps descending away from the piston owing to the inertia force. Thus the volume of the lower chamber is kept from increasing excessively after the piston has struck the object. This will prevent cavitation in the lower chamber. When thereafter the lower chamber communicates with the oil feed port and pressure oil is fed thereinto, the cylindrical member will be pushed up toward the large-diameter portion under oil pressure in the lower chamber.

6 Claims, 5 Drawing Sheets

HYDRAULIC IMPACT TOOL

The present invention relates to a hydraulic impact tool adapted to be mounted on the head of a hydraulic power shovel or the like and used to demolish a concrete structure, crush rocks, or excavate a rock base.

Hydraulic impact tools can be classified roughly into an accumulator type and a gas pressure type. With an accumulator type tool, pressurized oil is accumulated in an accumulator while a piston is rising and is released during its downward stoke to accelerate the piston.

With a gas pressure type tool, one example of which is disclosed in U.S. Pat. No. 4034817, a piston compresses a gas filled in the space above the piston to store energy when it rises under oil pressure. During its downward stroke, the compressed gas expands to accelerate the piston. The prior art impact tool is shown in FIG. 12 in which numeral 1 designates a cylinder and a tool 2 such as a chisel is slidably mounted in the lower end thereof.

A piston 4 formed with a large-diameter portion 3 is mounted in the cylinder 1 to strike the tool 2. The cylinder 1 has an upper chamber 5 charged with gas over the piston 4 to exert the gas pressure on the piston 4 as it reaches its upper limit.

The piston 4 has small-diameter portions over and under the large-diameter portion 3. A middle chamber 6 and a lower chamber 7 are formed between these small-diameter portions and the inner periphery of the cylinder 1.

A valve chest 8 is formed at one side of the cylinder 1. A valve body 10 formed with a center bore is mounted in the valve chest 8. The valve chest communicates with the cylinder 1 through oil channels 14, 15 extending from the upper and lower parts of the former to the upper part of the middle chamber 6 and to the lower part of the lower chamber 7, respectively. Further, the cylinder 1 and the valve chest 8 have their respective mid-portions communicating with each other by means of one main oil channel 15 and a branch channel.

The valve chest 8 has its upper and lower parts connected to a discharge port 11 and an oil feed port 12, respectively. From the oil feed port 12, another oil channel branches and leads to the top end of a plunger 13 for pressing down the valve body 10.

In operation, when the valve body 10 is at its lowermost position, pressure oil is supplied through the oil feed port 12 to pressurize the lower chamber 7. Since the middle chamber 6 is open to the discharge port 11, the piston 4 rises up in the cylinder to compress the gas in the upper chamber 5.

When the piston 4 approaches the uppermost position, the oil feed port 12 gets into communication with the middle oil channels 15 through which pressure oil flows into the valve chest 8 to push up the valve body 10. As soon as the valve body 10 clears the bottom of the valve chest 8, the lower chamber 7 communicates with the discharge port 11 through the bore 9 in the valve body 10. Thus, the piston 4 is pushed down by the pressure of gas in the upper chamber 5 to strike the tool 2.

With this prior art impact tool, when the piston 4 rebounds violently immediately after striking the tool 2, the pressure in the lower chamber 7 drops sharply because the chamber 7 is open to the discharge port 11, thus allowing air bubbles in the hydraulic oil to grow rapidly. This phenomenon is called cavitation. When the valve body 10 descends thereafter and pressure oil flows back into the lower chamber 7, the pressure in the lower chamber will increase sharply. Thus the air bubbles which have grown large will collapse in an instant, producing a very high pressure and a shock wave. This happens repeatedly several hundred times a minute. Thus, the piston 4 and the cylinder 1 tend to develop erosion on their surface after long use.

It is an object of the present invention to provide an impact tool which is less susceptible to erosion on the surface of its piston and cylinder owing to cavitation.

In accordance with the present invention, a cylindrical member is slidably mounted between the piston and the inner wall of the cylinder. It moves down with the piston during the downward movement of the piston, but keeps moving down under the inertia force when the piston rebounds and rises violently after striking the tool. This prevents a rapid increase in the volume of the lower chamber and a rapid decrease in the pressure in the lower chamber.

When both the valve body and the piston are at their lowermost position, the lower chamber communicates with the oil feed port, whereas the middle chamber communicates with the discharge port. Thus the piston is pushed up, compressing the gas in the upper chamber.

During the upward stroke of the piston, the valve body will begin to rise under oil pressure. When it rises to such a level that the lower chamber communicates with the discharge port through the bore formed through the valve body, the piston will begin to descend at a high speed under the gas pressure in the upper chamber to strike the tool.

When the piston strikes the tool and rebounds upwardly, the cylindrical member mounted on the piston keeps going down under the influence of inertia force. This will prevent any sharp change in the volume of the lower chamber and thus any sharp pressure drop. This will in turn prevent the growth of air bubbles contained in the hydraulic oil in the lower chamber, so that no cavitation will occur.

According to the present invention, damage to the piston and the cylinder is reduced to a minimum and the durability of the impact tool increases.

After the piston has risen to a given level, the cylindrical member is adapted to be pushed up under oil pressure so as to move together with the piston. Thus the cylindrical member will scarcely affect the reciprocating motion of the piston so that the piston can move smoothly.

The tool according to the present invention differs from a conventional tool only in that the cylindrical member is fitted on the piston around its large-diameter portion or thereunder. The other parts or portions such as the oil channels and the valve mechanism are identical in construction to those of a conventional impact tool. Thus its construction is simple.

Other features and objects of the present invention will become apparent from the following description taken with reference to the accompanying drawings, in which.

Figure 1:
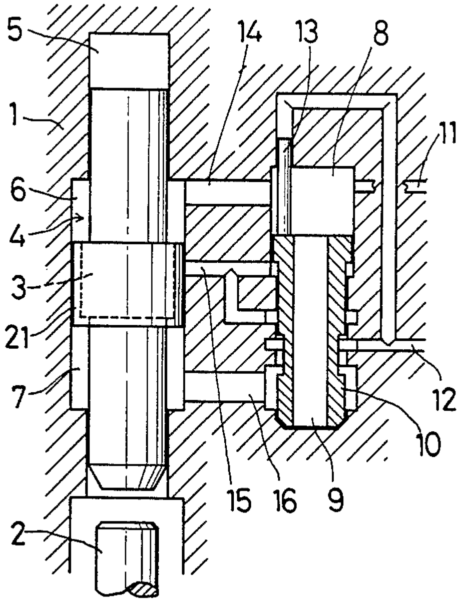
FIG. 1 is a vertical sectional front view of the first embodiment of the present invention.
Figure 2:
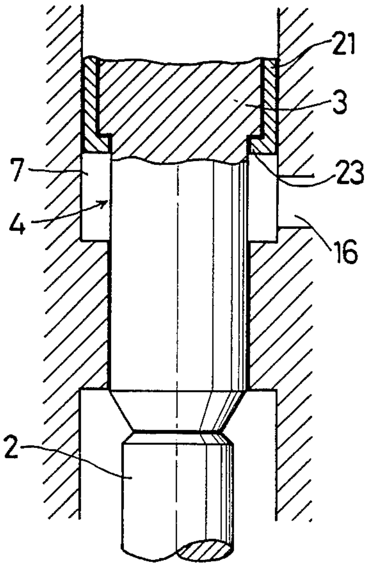
FIGS. 2 and 3 are vertical sectional enlarged front view of the same showing how it operates.
Figure 3:
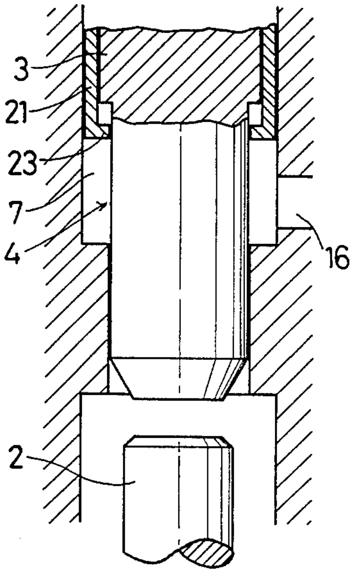
Figure 12:
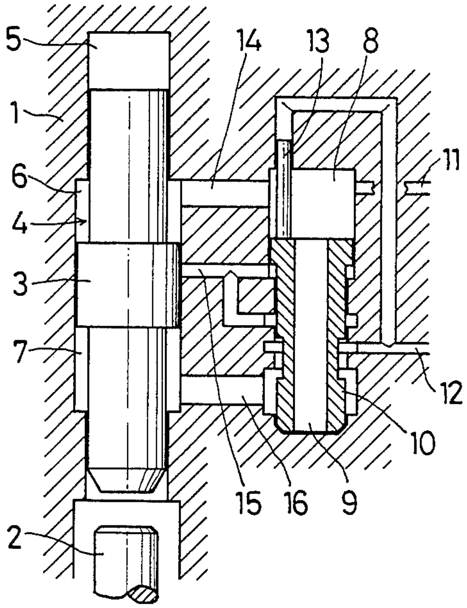
FIG. 12 is a vertical sectional front view of a prior art impact tool.

FIGS. 1 to 3 show the first embodiment which differs from the prior art tool shown in FIG. 12 only in that the large-diameter portion 3 of the piston 4 is slightly smaller in diameter than on the prior art tool, and a cylindrical member 21 is slidably mounted on the large-diameter portion 3. It is integrally formed at its bottom end with an inturned annular flange 23.

The tool of this embodiment operates in substantially the same way as the prior art tool shown in FIG. 12. But its operation immediately after the piston has struck the tool 2 is slightly different from that of the prior art tool.

Namely, when the piston 4 is descending under the gas pressure in the upper chamber 5 with the lower chamber 7 in communication with the discharge port 11, the cylindrical member 21 mounted on the large-diameter portion 3 of the piston 4 descends together with the piston until the piston 4 strikes the tool. (FIG. 2)

Upon striking the tool, the piston 4 will rebound and rise violently. But the cylindrical member 21, which is slidable with respect to the piston 4, will keep descending owing to the inertia force. In other words, the bottom edge of the cylindrical member 21 will move away from that of the large-diameter portion 3 as shown in FIG. 3.

Since the cylindrical member 21 keeps descending while the piston 4 is rebounding, the volume of the lower chamber 7 will be kept from increasing sharply immediately after impact. This will keep the lower chamber 7 from being put under negative pressure and thus avoid the development of cavitation.

Although immediately after impact the bottom of the cylindrical member 21 will move away from the bottom of the large-diameter portion 3, when the lower chamber 7 communicates with the oil feed port 12 and hydraulic oil begins to flow into the lower chamber 7, the cylindrical member 21 will be pushed up under the pressure in the lower chamber 7.

The cylindrical member 21 will rise until its flange 23 come into abutment with the bottom end of the large-diameter portion 3. Then the piston 4 and the cylindrical member 21 will rise together and descend together as if in one piece until the piston 4 again strikes the tool 2.

Figure 4:
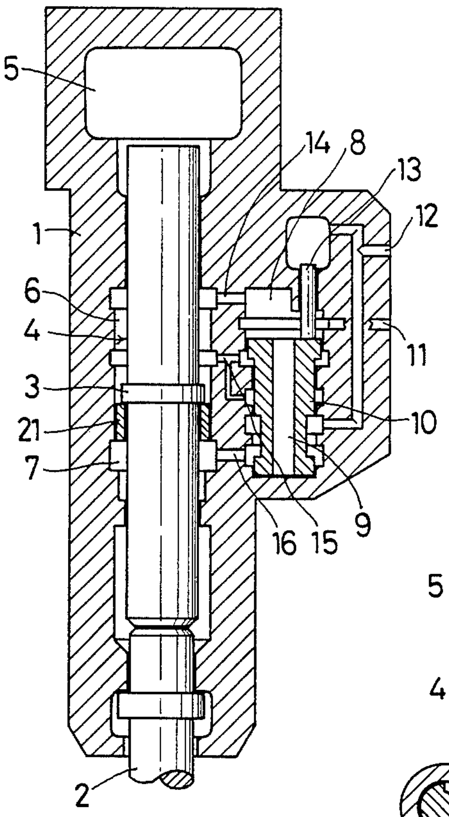
FIGS. 4 to 6 are vertical sectional front views of the second to fourth embodiments, respectively.

In the second embodiment shown in FIG. 4, the large-diameter portion 3 of the piston 4 is short in length and flange-like. A cylindrical member 21 is slidably mounted on the piston 4 so that its top end abuts the bottom end of the large-diameter portion 3. Otherwise, this embodiment is identical in construction and function to the first embodiment.

Figure 5:
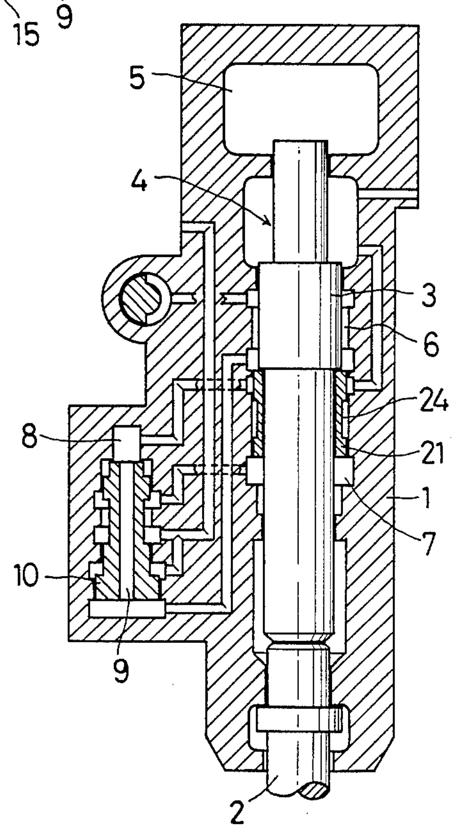

The third embodiment shown in FIG. 5 slightly differs from the above-described embodiments in the hydraulic circuit. This arrangement requires a longer large-diameter portion 3 and the provision of an annular groove 24 around the cylindrical member 21.

In this embodiment too, the cylindrical member 21 is adapted to move away from the large-diameter portion 3 immediately after the piston 4 has struck the tool 2, to prevent a sharp drop in pressure in the lower chamber 7.

Figure 6:
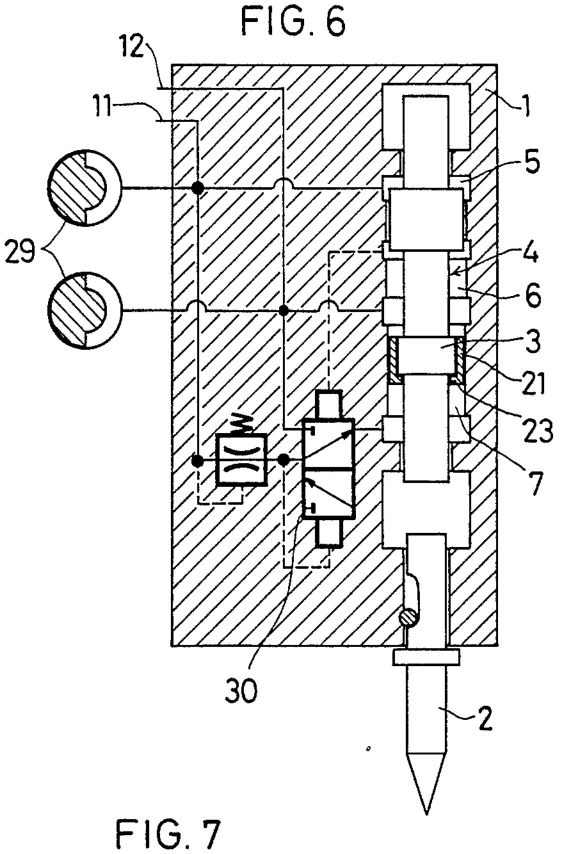

While the above-described embodiments are related to gas pressure type impact tools, the fourth embodiment shown in FIG. 6 is an impact tool of an accumulator type.

In this figure, numeral 29 designates an accumulator and 30 designates an oil pressure changeover valve. The piston 4 is adapted to move up and down by switching hydraulic circuits leading to the upper chamber 5, the middle chamber 6 and the lower chamber 7, respectively. In this figure, the cylindrical member 21 is slidably mounted on the large-diameter portion 3 of the piston 4 and the inturned flange 23 is formed at the bottom edge of the member 21 as in the first embodiment. But the cylindrical member 21 may be formed as in the second and third embodiments. In this embodiment, a gas is sealed in a chamber formed over the upper chamber to auxiliarily apply pressure to the top of the piston.

Figure 7:
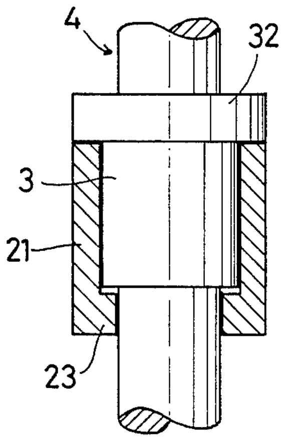
FIGS. 7, 8A and 8B, 9A and 9B, 10A and 10B and 11 are vertical sectional front views of five modifications of the embodiments of FIG. 1.

FIG. 7 shows a modification of the first embodiment in which the large-diameter portion 3 is integrally provided at its top end with a flange 32 so that when the cylindrical member 21 rises with respect to the piston 4, the cylindrical member 21 will abut the flange 32 at its top end, thus keeping the inturned flange 23 out of contact with the bottom end of the large-diameter portion 3.

This arrangement will be effective in preventing cracks from being formed at the top end of the inturned flange 23 and at the inner periphery of the cylindrical member 21 near its bottom end.

Figure 8A:
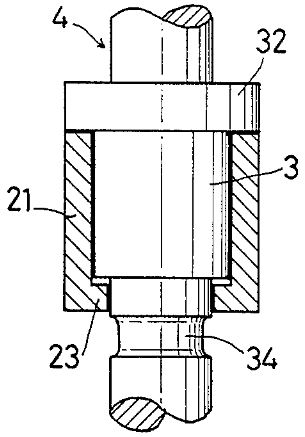
Figure 8B:
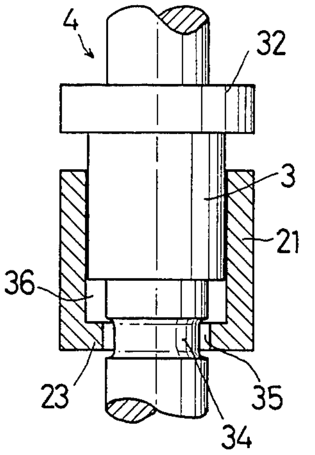

FIGS. 8A and 8B show a further modification of the example shown in FIG. 7 in which the piston 4 is formed in its outer periphery below its large-diameter portion 3 with an annular groove 34.

With this arrangement when the cylindrical member 21 lowers with respect to the piston 4 (FIG. 8A), a gap 35 will be formed between the annular groove 34 and the inturned flange 23 so that a sufficient amount of oil can be supplied into a cushioning chamber 36.

Figure 9A:
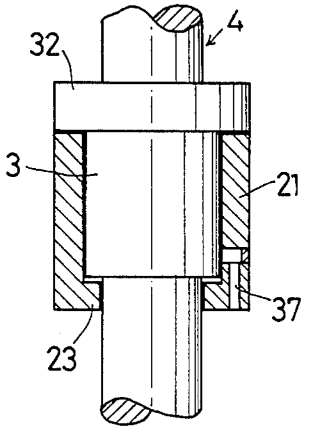
Figure 9B:
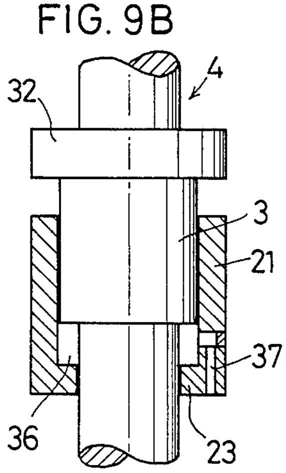

FIGS. 9A and 9B show another example, which has the same function as the example shown in FIG. 8. In this example, the cylindrical member 21 is formed with a channel 37 therein. When the cylindrical member 21 lowers with respect to the piston 4 (FIG. 9B), oil will flow into the cushioning chamber 36 through the channel 37.

Figure 10A:
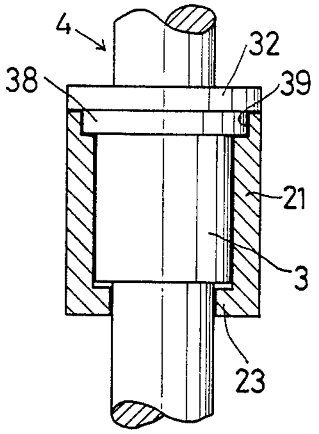
Figure 10B:
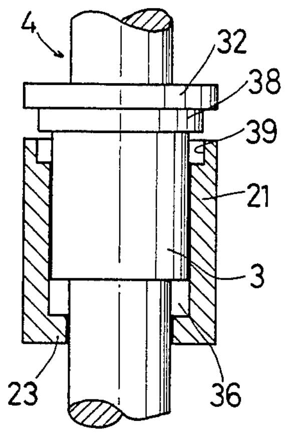

In still another example shown in FIGS. 10A and 10B, the flange 32 is stepped so that its lower half portion 38 has a smaller diameter and the cylindrical member 21 has its top end recessed circumferentially along its inner edge as shown at 39. When the cylindrical member 21 lowers with respect to the piston 4 (FIG. 10B), oil will flow into the recess 39 to serve as a cushion when the cylindrical member 21 rises again.

The larger the size of the piston 4 and hence the larger the mass of the cylindrical member 21, the larger the inertia force acting on the cylindrical member 21 will be. This will cause the cylindrical member 21 to descend too far downward and thus badly influence the operation of the impact tool.

Figure 11:
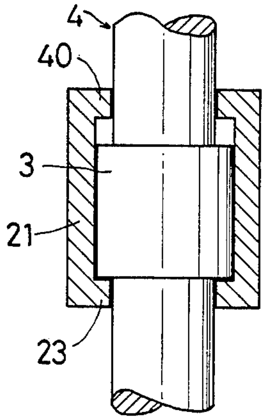

To solve this problem, another inturned flange 40 may be provided at the top end of the cylindrical member 21 as shown in FIG. 11 to restrict the downward stroke of the cylindrical member 21.

In the preferred embodiments, there has been shown only impact tools having the piston mounted in direct contact with the cylinder for simplification. But an impact tool having its piston mounted in a cylinder through a bushing is also within the scope of the present invention.

In the preferred embodiments, there has been shown only impact tools in which the lower chamber communicates with the oil discharge port during the downward stroke of the piston. But, the present invention is also applicable to impact tools in which the lower chamber does not communicate with the oil discharge port during the downward stroke of the piston, but is always in communication with the oil supply port.

Although the above-described embodiments are related to impact tools, the concept of the present invention will be applicable to not only an impact tool but also other tools and devices such as a pile driver in which an impact is given to an object during its downward stroke.

What is claimed is:

1. A hydraulic impact tool for striking a tool, comprising:

a cylinder in which the tool can be slidably mounted in a lower end thereof;

a piston slidably mounted in said cylinder for striking the tool during its downward movement, said piston having a large-diameter portion, said cylinder having an upper chamber filled with a fluid to apply fluid pressure to the top of said piston, and a middle chamber in which said large-diameter portion is slidable and having an upper portion above said large-diameter portion and a lower portion below said large-diameter portion, respectively;

a valve chest connected to said upper portion and said lower portion and having an oil supply port and an oil discharge port;

a valve body slidably mounted in said valve chest for controlling the communication between said upper portion and said lower portion and said oil supply port and said oil discharge port, respectively, for supplying oil to and removing oil from said cylinder for alternately raising and lowering said piston; and a cylindrical member slidably mounted on said piston beneath said large-diameter portion and slidable on said piston between said piston and the inner periphery of said cylinder and the bottom of said cylindrical member defining the top end of said lower chamber.

2. A hydraulic impact tool for striking a tool, comprising:

a cylinder in which the tool can be slidably mounted at a lower end thereof;

a piston slidably mounted in said cylinder for striking the tool during its downward movement, said piston having a large-diameter portion, said cylinder having an upper chamber filled with a fluid to apply fluid pressure to the top of said piston, and a middle chamber in which said large-diameter portion is slidable and having an upper portion above said large-diameter portion and a lower portion below said large-diameter portion, respectively;

a valve chest connected to said upper portion and said lower portion and having an oil supply port and an oil discharge port;

a valve body slidably mounted in said valve chest for controlling the communication between said upper portion and said lower portion and said oil supply port and said oil discharge port, respectively, for supplying oil to and removing oil from said cylinder for alternately raising and lowering said piston; and a cylindrical member mounted on said piston around said large-diameter portion and having at the bottom end thereof an inturned annular flange which, when said cylindrical member is in its uppermost position, engages the bottom end of said large-diameter portion.

3. An impact tool as claimed in claim 2, wherein said large-diameter portion has a top portion protruding radially to form a flange and said cylindrical member is so dimensioned that in its uppermost portion the top end of said cylindrical member abuts the bottom of said flange, and in said uppermost position of said cylindrical member said inturned flange will be out of contact with the bottom end of said large-diameter portion.

4. An impact tool as claimed in claim 3, wherein said piston has thereon at a point below the bottom end of said large-diameter portion an annular groove so that when said cylindrical member moves away from said flange formed at the top of said large-diameter portion by a predetermined distance to bring the inner edge of said inturned flange opposite said annular groove, a gap will be formed between the inner edge of said inturned flange and said piston.

5. An impact tool as claimed in claim 3, wherein said cylindrical member has a channel therein to pass oil therethrough.

6. An impact tool as claimed in claim 3, wherein said flange at the top of said large-diameter portion has a lower portion smaller in diameter than the upper portion and larger in diameter than the large-diameter portion and said cylindrical member has a recess around the top end along the inner edge thereof around the whole periphery, said lower half portion of said flange snugly fitting in said recess.

* * * * *